United States Patent

[11] 3,592,067

| [72] | Inventor | Walter Hetzer |
| | | Haidholzen, Germany |
| [21] | Appl. No. | 816,315 |
| [22] | Filed | Apr. 15, 1969 |
| [45] | Patented | July 13, 1971 |
| [73] | Assignee | Messerschmitt-Bolkow Gesellschaft mit beschrankter Haftung |
| | | Munich, Germany |
| [32] | Priority | Apr. 20, 1968 |
| [33] | | Germany |
| [31] | | P 17 50 322.9 |

[54] DEVICE FOR CONVERTING BETWEEN LINEAR AND CIRCULAR MOVEMENT
6 Claims, 1 Drawing Fig.

| [52] | U.S. Cl. | 74/55 |
| [51] | Int. Cl. | F16h 25/08 |
| [50] | Field of Search | 74/55, 54, 567, 568 |

[56] References Cited
UNITED STATES PATENTS

| 546,055 | 9/1895 | Pitt | 74/56 |
| 555,465 | 2/1896 | Prosser | 74/55 |
| 2,450,912 | 10/1948 | Putnam | 74/55 |
| 3,427,888 | 2/1969 | Rheinlander | 74/55 |

*Primary Examiner*—Milton Kaufman
*Assistant Examiner*—Wesley S. Ratliff, Jr.
*Attorney*—McGlew and Toren ABSTRACT: A device for converting between linear and circular movement, is composed of a rodlike member, capable of linear movement, in contact with a cam surface formed on a shaft, capable of circular movement. The cam surface is formed as an evolute curve based on a base circle determined by the circumference of the shaft. The rodlike member has punctiform contact with the cam surface, and each contact point is on a tangent to the base circle aligned rectilinearly with the axis of reciprocation of the rodlike member.

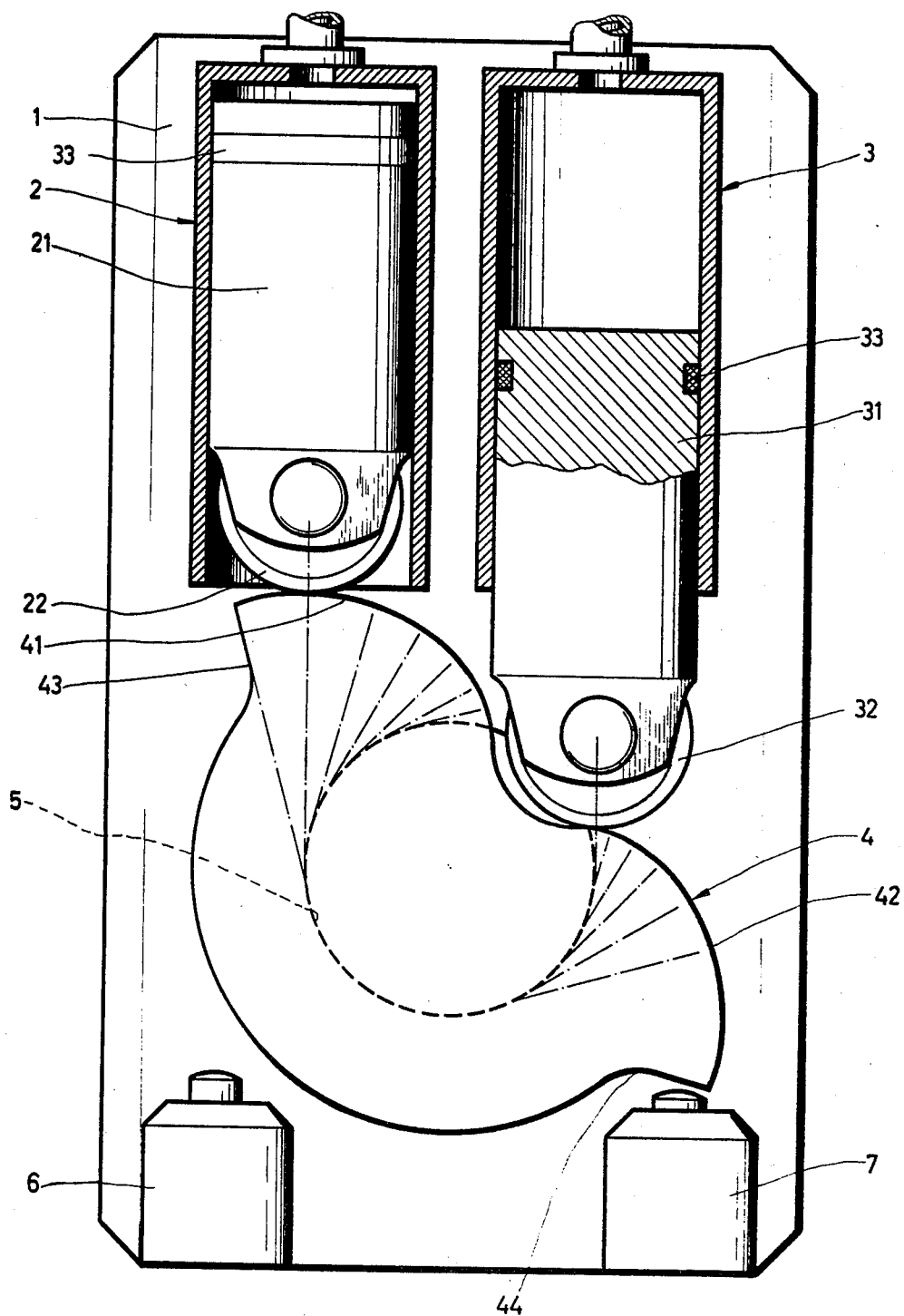

DEVICE FOR CONVERTING BETWEEN LINEAR AND CIRCULAR MOVEMENT

SUMMARY OF THE INVENTION

The invention is directed to a device for changing linear to circular movement or, conversely, circular movement to linear movement, and, more particularly, it concerns a specially configured cam surface on a disc rigidly mounted on a shaft and in contacting engagement with a linearly moving rod member.

Devices and gears for converting between linear and circular movement are known. For example, in the German Pat. No. 964,458, a gear arrangement is described for transfroming uniform rotary movement into a uniform reciprocating movement with the conversion between rotary and linear movement being effected by means of a cam disc having a so-called cardioid cam. However, it is difficult to produce such a cam disc for use with a gear, and in addition, the diameter of a roller connected to the reciprocating piston rod which travels along the edge of the cam disc, must be taken into account in the formation of the cardioid cam.

To simplify the production of such cardioid cams, in view of the additional conditions which must be considered, the curved surface representing the cardioid cam is composed in the known arrangement, of two separate curved pieces which are rotatably mounted on a common axis. Further at least one of the curved pieces can be shifted about a separate point so that a uniform reciprocating movement can be effected based on the rotation of the cam disc.

These known devices have the disadvantage that they can not ensure an exact linear movement, even though considerable expenditures are made for the production of the cam disc and the additional accurate adjustment which is required for the individual curved pieces, without producing action and reaction forces during the engagement of the rotating cam disc and the reciprocating piston rod whose lines of action are inclined with respect to the longitudinal axis of the piston rod.

Another well known gear arrangement for the transformation of linear into rotary movement involves the use of a rack for the linear motion and a pinion engaging the rack for the rotary motion. However, these gears also have the disadvantage, apart from the strictly linear forces acting in the longitudinal direction of the rack, that action and reaction forces acting perpendicularly to the rack are developed during the transmission of movement to or from the pinion, and these forces, compared to those acting in the longitudinal direction, are considerable and can cause the rack to be canted unless step bearings are provided for exerting corresponding counteracting forces. Moreover, in such rack and pinion gear arrangements, it is necessary to limit the amount of play between the rack and the pinion, which would otherwise result in increased friction forces.

If a rack, in the arrangement as described, is connected with a piston rod of a hydraulic or pneumatic servomotor, a slight lateral displacement of the piston within the servomotor develops because of the action and reaction forces and results in a considerable increase in the leakage losses within the servomotor. If, however, the rack has a step bearing which balances the reaction forces of the pinion, then the resulting friction forces which result must be counteracted by the servomotor.

Therefore, it is the primary object of the present invention to provide a device for the transformation of linear motion into uniform rotary motion and vice versa, where substantially no action and reaction forces are developed between the rotating and the linear reciprocating elements except those which act either directly in the line of either longitudinal movement of the reciprocating motion or tangentially of the rotating element.

Moreover, since the device, in accordance with the present invention, involves a minimum loss of force during the conversion between linear and rotary motion and, further, because there is no problem concerning play between the elements effecting the conversion, no additional means are required for guiding and supporting the reciprocating elements which would result in friction forces. Therefore, a conversion between linear and rotary movement can be attained, involving at least one piston rod acting against a cam surface of a disc rigidly secured to a shaft, where the novel characteristic involves the formation of an evolute curve on the cam surface which is determined from the circular shape of the shaft.

Though the use of evolute curves has been known in gears, they have been used, in the past, only to determine the configuration of the teeth on gears.

The cam surface having the form of an evolute for the conversion between linear and circular movement has the advantage that a reciprocating piston or rod at any contacting position along the cam surface acts exactly perpendicularly to the surface, and its line of action extending in the longitudinal direction of the piston coincides exactly with a tangent to the base circle for the evolute surface formed by the circumference of the shaft. Another advantage obtained from the use of such a cam surface is that it can be easily produced with great precision.

Another favorable characteristic of this arrangement is that no variation develops between the relative velocity of the rotary and linear elements, that is, the velocity of the piston is converted along any position on the cam surface into the same speed of rotation for the shaft. As a result, a constant initial torque is developed over the entire course of movement between the elements.

In a preferred embodiment of the invention, two reciprocating piston rods are arranged in parallel relationship so that they act in the same direction but are displaced in their reciprocating action by 180° so that one piston rod is being extended while the other is being retracted. Each of the piston rods contacts an evolute surface formed on a disc secured to a common shaft.

Using this design, with the displacement in phase of the linearly moving piston rods, it is possible to produce a rotary movement in the shaft in direct relationship to the linear displacement of the piston rods.

When a device of the type described is used for the conversion of linear movement into circular movement, for example, in a launching device for guided missiles, which can be adjusted in elevation and direction, it is sufficient if the rotary movement covers only a portion of a circle. Such movement can be produced by a pair of hydraulic servomotors providing linear movement to their corresponding piston rods. Further, the limits of rotary movement of the shaft can be determined by employing limit switches which effect a reversal in the direction of movement of the rods in the servomotors when a certain point in the path of the rotating shaft is reached.

To operate the limit switch at each end of the rotary path of travel of the shaft, the opposite ends of the evolute cam surfaces on the disc are shaped representing an extension of a tangent to the circumference of the shaft and intersecting the evolute at its point most remote from the shaft.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

The drawing is an elevational view, partly in section, of a preferred embodiment of the invention.

DETAILED DESCRIPTION OF THE PREFERRED EMBODIMENT

In the drawing, a pair of laterally spaced hydraulic servomotors 2 and 3 are arranged in parallel relationship within a housing 1. Each of the servomotors 2 and 3 contain a combination piston and piston rod 21, 31 which act in the same direction. However, as indicated in the drawing, the piston rods 21, 31 are displaced 180° to one another, that is, while one of the rods is being retracted within its servomotor, the other rod is being extended. A roller 22, 32 is located at the end of each of the piston rods 21, 31 which project from the lower ends of the servomotors.

Disposed below the servomotors and spaced between their longitudinally extending axes is a shaft 5 having a disc 4 rigidly mounted on it and arranged to rotate in a plane intersecting the planes of movement of the piston rods. The disc 4 is provided with a pair of cam surfaces 41, 42 which are disposed symmetrically of the shaft and are arranged in opposed relationship to the rollers 22, 32 on the piston rods 21,31. The cam surfaces 41, 42 are formed of evolutes from the circle formed by the circumference of the shaft. The length of the evolute cam surfaces extending from the base circle formed by the shaft is determined by the amount of rotary movement required.

In the arrangement shown in the drawing, since only s small rotary movement is required to be imparted to the shaft in each direction from a center point, the evolute cam surfaces are discontinued at points relatively close to the base circle or shaft. At the outer limits of the cam surfaces remote from the shaft the surface of the disc returns inwardly forming a pair of edges 43, 44. The inward extension of the edges 43, 44 forms a tangent with the base circle or shaft. The common surface between the evolute cam surfaces is shown as a circular arc symmetrically arranged with respect to the axis of the shaft, however, any other curve form may be employed in accordance with the requirements of the device.

At the limits of the rotation of the shaft, the edge surfaces 43, 44 contact a pair of laterally spaced limit switches 6 and 7 which are arranged on the opposite sides of the shaft from the sevomotors 2 and 3. As indicated in the drawing, when the right-hand piston rod 31 in servomotor 3 has reached its fully extended position the corresponding edge surface 44 of the disc contacts the limit switch 7 which, in turn, operates the servomotors. In other words, when the servomotor has fully extended the piston rod 32, the limit switch 7 reverses the direction of travel of the piston rods and the piston rod 21, as it starts to extend from the servomotor 2, causes the disc to rotate counterclockwise until the edge surface 43 of the cam surface 41 contacts the corresponding limit switch 6 for again reversing the action of the servomotors. The connection between the limit switches and the servomotors is not indicated since such an arrangement is well known in the art and does not form a part of the present invention.

As can be seen from the drawing, the piston rods 21, 31 through their roller 22, 32 act perpendicularly on the cam surfaces of the disc 4 so that the lines of action of the forces of the piston rods in their longitudinal direction of travel align exactly with tangents to the base circle or shaft from which the evolute cam surfaces have been determined. This ensures that, apart from the slight rolling friction developed between the roller 22, 32 and the cam surfaces 41, 42 on the disc 4, no oblique forces act on the piston rods and, as a result, the piston rods are stressed only in the longitudinal direction and do not require the use of any step bearings which would introduce additional friction into the arrangement. Moreover, since the pistons act in the longitudinal direction and there is no lateral displacement of their axes there is no leakage losses beyond the normal low levels which develop in the hydraulic servomotors. If O-rings 33 are used as sealing elements, as indicated in the drawing, there are no leakage losses at all.

As can be readily appreciated from the drawing, the cam surfaces 41, 42 on the disc can be produced with great precision in a simple manner, such as by using a milling cutter moving uniformly in the direction of the pistons cutting off corresponding parts of a circular disc with simultaneous rotation of the disc about the axis of the shaft which forms the base circle for the evolute surfaces formed on the disc.

Because of the extremely low friction forces developed between the rollers 22, 32 and the cam surfaces of the disc, the amount of wear on the cooperating parts is negligible and the entire device is able to work accurately over a long useful life. The device which affords the conversion between linear and circular movement can be employed in connection with various devices where rotary movement of up to 360° is possible by means of a disc having a cam surface formed as an evolute curve. Though the preferred embodiment of the invention illustrated and described is intended particularly for use with hydraulic launching devices for guided missiles which can be adjusted both in elevation and direction and where considerable mass must be moved very accurately into a predetermined position and held positively in this position, it is also possible to use the invention in connection with machine tools, automatic machines, packing machines, or rudder and spoiler drives, where the same advantages can be achieved with respect to comparable known devices.

In the various applications of the invention, the cam disc can also embody the form of an inner evolute acting on a piston of a servomotor. Such an arrangement is designed in a similar manner as the devices for transforming linear movement into rotary movement by means of inner cams which are known in the art, see German Pat. No. 964,458, as mentioned above.

I claim:

1. A device for effecting a conversion between linear and circular movement comprising at least one rod arranged to reciprocate rectilinearly of its axis, a shaft mounted for rotation about an axis perpendicular to the axis of said rod, a disc rigidly secured to said shaft and positioned in a plane extending normally to the axis of said shaft, said disc having a curvilinear cam surface shaped on its circumferential periphery, said rod having one end disposed in punctiform contact with said cam surface of said disc, said cam surface has a curvature such that all points of punctiform contact of said rod end thereon are located on tangents to the base circle of said shaft and on the axis of said rod rectilinearly aligned with each tangent, so that one of the rotational movement of said shaft and the rectilinear movement of said rod is transformed to the movement of the other by the following action between said one rod end and said cam surface; whereby the line of action between said rod and said cam surface, during rotation of said shaft and reciprocation of said rod, is always coincident with the axis of said rod and a tangent to said base circle extending through the point of punctiform contact between said one end of said rod and said cam surface and reaction forces transversely of the direction of reciprocation of said rod are obviated during conversion of rotary motion of said shaft into linear reciprocation of said rod and vise versa.

2. A device for effecting a conversion between linear and circular movement comprising at least one rod arranged to be movable in a rectilinear direction, a shaft mounted for rotation about its axis, a disc rigidly secured to and extending transversely of said shaft, said disc having a cam surface shaped thereon formed as an evolute of a base circle established by the circumference of said shaft, and one end of said rod being disposed in contact with the cam surface of said disc whereby the movement of one of said shaft and rod is transformed to the movement of the other by the following action of the other said shaft and rod; comprising a pair of laterally spaced piston rods having the axes thereof disposed in parallel relationship, the axes of said piston rods being located on the opposite sides of the axis of said shaft which is disposed perpendicularly to the axes of said rods, said disc having a pair of said cam surfaces formed thereon, and one end of each of said piston rods being disposed in contact with a respective one of said cam surfaces of said disc.

3. A device, as set forth in claim 2, wherein the cam surfaces are symmetrically arranged on said disc and said piston rods are symmetrically disposed relative to said shaft, both of said piston rods acting in the same direction and the stoke of said piston rods being displaced by 180°.

4. A device, as set forth in claim 3, wherein a roller is mounted rotatably on the end of each of said piston rods with said rollers arranged to contact said cam surfaces whereby said rollers roll over said cam surfaces in the course of the relative movement of said piston rods and said shaft.

5. A device, as set forth in claim 4, including a pair of spaced limit switches mounted adjacent the path of travel of said disc on said shaft, the end of each cam surface on said disc more remote from the other cam surface being arranged to contact said limit switches for actuating them.

6. A device, as set forth in claim 5, wherein the said ends of the cam surfaces arranged to contact said limit switches return angularly inwardly from the cam surfaces toward said shaft and the inward extensions of said ends form tangents to said shaft.